No. 635,006. Patented Oct. 17, 1899.
J. J. WALSH.
INSULATED HANDLE FOR ELECTRICAL APPARATUS.
(Application filed Mar. 10, 1899.)
(No Model.)
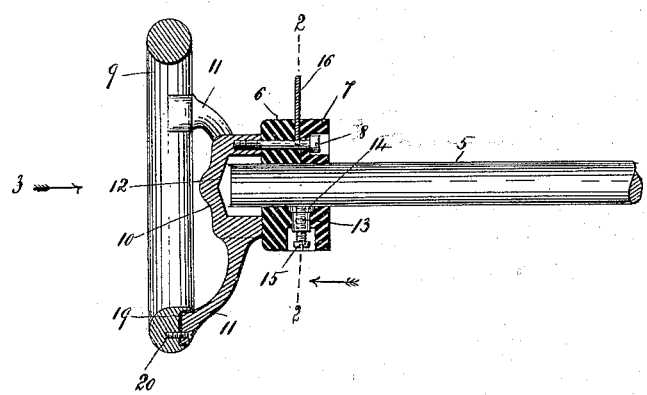
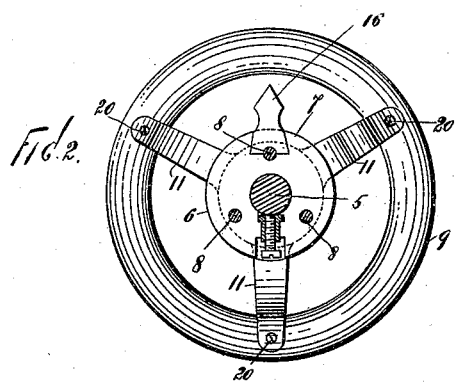
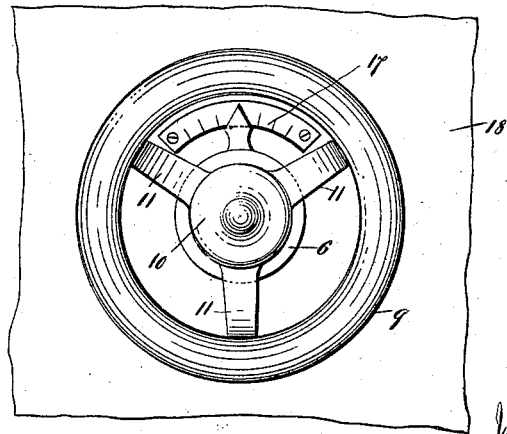
WITNESSES:
John Buckler
F. A. Stewart
INVENTOR.
John J. Walsh,
BY Edgar Tate & Co.
ATTORNEYS

UNITED STATES PATENT OFFICE.

JOHN J. WALSH, OF YONKERS, NEW YORK.

INSULATED HANDLE FOR ELECTRICAL APPARATUS.

SPECIFICATION forming part of Letters Patent No. 635,006, dated October 17, 1899.

Application filed March 10, 1899. Serial No. 708,522. (No model.)

*To all whom it may concern:*

Be it known that I, JOHN J. WALSH, a citizen of the United States, residing at Yonkers, in the county of Westchester and State of New York, have invented certain new and useful Improvements in Insulated Handles or Grips for Electrical Apparatus, of which the following is a full and complete specification, such as will enable those skilled in the art to which it appertains to make and use the same.

This invention relates to the controlling-shafts of rheostats and other electrical apparatus; and the object thereof is to provide an improved handle or grip for shafts of this class and improved means for connecting the same with the shaft.

The invention is fully dislosed in the following specification, of which the accompanying drawings form a part, in which—

Figure 1 is a sectional side view of a shaft provided with my improvement; Fig. 2, a section on the line 2 2 of Fig. 1, and Fig. 3 an end view looking in the direction of the arrow 3 of Fig. 1.

In the drawings forming part of this specification the separate parts of my improvement are designated by the same numerals of reference in each of the views, and in said drawings I have shown at 5 the shaft for manipulating or managing rheostats or other electrical apparatus, and in the practice of my invention I mount on said shaft an insulating-hub consisting of two similar parts 6 and 7, preferably composed of porcelain, but which may be composed of hard rubber or any suitable material, and these parts are connected by bolts 8, the heads of which are countersunk in the part 7. The outer ends of the bolts 8 are screw-threaded, and I also provide a handle or grip consisting of a ring 9, provided with a spider consisting of a central hub 10 and outwardly-curved arms 11. The hub 10 of the spider is provided with a central cavity or recess 12, into which the end of the shaft 5 projects, and the screw-threaded ends of the bolts 8 are screwed into the hub 10, as clearly shown in Fig. 1.

Mounted between the parts 6 and 7 of the insulating-hub, at one side thereof, is a tubular bearing 13, having a flat head 14, and said bearing is securely held in place by the parts 6 and 7 of the hub, and passed through said bearing is a set-screw 15, the head of which is countersunk in the insulating-hub, and said screw is adapted to bear on the shaft 5 and to secure the insulating-hub and the handle or grip 9 thereto. Mounted in the opposite side of the insulating-hub and held in place by the separate parts 6 and 7 thereof is a pointer 16, the larger end of which is wedge-shaped in form and fitted between the parts 6 and 7 of the insulating-hub, and in practice said pointer operates in connection with or moves over a scale-plate 17, secured to the casing 18 of the rheostat or other electrical apparatus, as shown in Fig. 3.

The handle or grip consisting of the ring 9 and the spider with which it is connected are preferably formed separately, and the ends of the arms 11 of the spider are countersunk into said ring, and preferably insulated therefrom, as shown at 19, and said arms and said ring are connected by screws or bolts 20.

By forming the spider and the ring 9, which constitutes the handle or grip, separately I am enabled to more completely insulate said ring, and the spider and said ring, handle, or grip may be composed of different material, if desired.

My improvement is simple in construction and operation and well adapted to accomplish the result for which it is intended, and it will be apparent that changes in and modifications of the construction described may be made without departing from the spirit of my invention or sacrificing its advantages.

Having fully described my invention, I claim as new and desire to secure by Letters Patent—

1. An insulating-hub for the shafts of rheostats and other electrical apparatus, consisting of two separate parts of insulating material bolted together and keyed to said shaft, substantially as shown and described.

2. An insulating-hub for the shafts of rheostats and other electrical apparatus, consisting of two separate parts of insulating material bolted together and keyed to said shaft, said hub being provided with a handle or grip which is secured thereto, substantially as shown and described.

3. An insulating-hub for the shafts of rheostats and other electrical apparatus consisting of two separate parts of insulating material bolted together and keyed to said shaft, said hub being provided with a handle or grip which is secured thereto, and with a pointer which is secured between the separate parts thereof at one side, substantially as shown and described.

4. A controlling-shaft for rheostats and other electrical apparatus provided with an insulating-hub which is secured thereto, a spider connected with the insulating-hub, and provided with outwardly-directed arms, and a handle or grip connected with said arms, substantially as shown and described.

5. A controlling-shaft for rheostats and other electrical apparatus provided with an insulating-hub which is secured thereto, a spider connected with the insulating-hub, and provided with outwardly-directed arms, and a handle or grip connected with said arms, and insulated therefrom, as and for the purpose set forth.

6. The herein-described means for manipulating the operating-shaft of a rheostat or other electrical apparatus, consisting of an insulating-hub composed of two parts bolted together and secured to said shaft, and provided at one side with a pointer, and a handle or grip connected with said hub by the bolts by which the parts of said hub are connected, substantially as shown and described.

7. The combination with the operating-shaft of a rheostat or other electrical apparatus, of an insulating-hub keyed thereto and composed of two separate parts of insulating material bolted together, a spider provided with a central hub which is bolted to said insulating-hub and with outwardly-directed arms, and a handle or grip consisting of a ring secured to said arms, substantially as shown and described.

In testimony that I claim the foregoing as my invention I have signed my name, in presence of the subscribing witnesses, this 8th day of March, 1899.

JOHN J. WALSH.

Witnesses:
P. H. REORDEN,
CHARLES A. VALENTINE, Jr.